United States Patent
Neugebauer

(10) Patent No.: US 7,852,761 B2
(45) Date of Patent: Dec. 14, 2010

(54) DUTY CYCLE CONTROL FOR NETWORKS OF NODES

(75) Inventor: Mario Neugebauer, Dresden (DE)

(73) Assignee: SAP AG, Walldorf (DE)

( * ) Notice: Subject to any disclaimer, the term of this patent is extended or adjusted under 35 U.S.C. 154(b) by 778 days.

(21) Appl. No.: 11/517,459

(22) Filed: Sep. 7, 2006

(65) Prior Publication Data
US 2008/0062865 A1    Mar. 13, 2008

(51) Int. Cl.
H04L 12/26    (2006.01)
(52) U.S. Cl. ................... 370/230.1; 370/235
(58) Field of Classification Search ......... 370/229, 370/230.1, 232, 233, 234, 235
See application file for complete search history.

(56) References Cited

U.S. PATENT DOCUMENTS

| | | | |
|---|---|---|---|
| 5,901,138 A * | 5/1999 | Bader et al. | 370/229 |
| 6,510,160 B1 * | 1/2003 | Nikuie et al. | 370/412 |
| 6,563,796 B1 * | 5/2003 | Saito | 370/252 |
| 6,836,469 B1 * | 12/2004 | Wu | 370/322 |
| 2003/0099221 A1 | 5/2003 | Rhee | |
| 2004/0132410 A1 * | 7/2004 | Hundal et al. | 455/67.13 |
| 2005/0152330 A1 * | 7/2005 | Stephens et al. | 370/350 |

FOREIGN PATENT DOCUMENTS

| | | |
|---|---|---|
| WO | 2007087466 A2 | 8/2007 |
| WO | 2008041137 A2 | 4/2008 |

OTHER PUBLICATIONS

Neugebauer et al, "A New Beacon Order Adaptation Algorithm for IEEE 802.15.4 Networks", IEEE proceedings of he Second European Workshop on Wireless Sensor Networks, 2005, pp. 302-311, ISBN 0-7803-8801-1, version publication date Jul. 25, 2005.*
"Part 15.1: Wireless Medium Access Control (MAC) and Physical Layer (PHY) Specifications for Wireless Personal Area Networks (WPANs)", IEEE Std 802.15.1—2005, (Jun. 14, 2005), 600 pgs.

(Continued)

Primary Examiner—Kwang B Yao
Assistant Examiner—Andrew Lai
(74) Attorney, Agent, or Firm—Brake Hughes Bellerman LLP

(57) ABSTRACT

Data packets from a network node may be monitored at a relay station associated with the network that is configured to forward the data packets to a base station. The network node may transmit the data packets according to a first duty cycle. At least one transmission parameter associated with transmission of the data packets from the network node to the relay station may be determined, and then may be related to at least one reference value to obtain a normalized transmission parameter. The normalized transmission parameter may be compared to a set-point value, and a duty cycle change command may be generated for the network node to forward subsequent data packets according to a second duty cycle, based on the comparison.

16 Claims, 12 Drawing Sheets

OTHER PUBLICATIONS

"Part 15.4: Wireless Medium Access Control (MAC) and Physical Layer (PHY) Specifications for Wireless Personal Area Networks (WPANs)", IEEE Std 802.15.4—2003, (Oct. 1, 2003), 679 pgs.

Chenyang, Lu, et al., "A Feedback Control Approach for Guaranteeing Relative Delays in Web Servers", IEEE Real-Time Technology and Applications Symposium (RTAS'01), (Jun. 2001),12 pgs.

Neugebauer, Mario, et al., "A New Beacon Order Adaptation Algorithm for IEEE 802.15.4 Networks", IEEE, (Jan. 31, 2005), 302-311.

Neugebauer, Mario, et al., "Duty Cycle Adaptation with Respect to Traffic", IEEE, (Sep. 19, 2005), 8 pgs.

Neugebauer, Mario, et al., "Sensor Networks for (Building) Automation", Sensor Networks for (Building) Automation, Energy Efficiency, Technische Universitat Dresden, SAP, (Feb. 10, 2005),1-17.

Office Action for Chinese Application No. 200710149064.8 (with English translation), mailed May 10, 2010, 22 pages.

Nar, P.C., et al, "PCSMAC: A Power Controlled Sensor-MAC Protocol for Wireless Sensor Networks", Proceedings of the 2nd European Workshop on Wireless Sensor Networks, Jan. 31, 2005, pp. 81-92.

* cited by examiner

DUTY CYCLE CONTROL FOR NETWORKS OF NODES

TECHNICAL FIELD

This description relates to transmission controls in networks of nodes.

BACKGROUND

Software systems may be extended through the use of smart item (also referred to as smart device), technologies, in which physical items (e.g., goods, tools, rooms, vehicles, persons, or shelves) are augmented or enhanced by the addition or inclusion of locally-provided or embedded technology. For example, radio-frequency identification (RFID) systems, embedded systems, sensor motes, and/or wireless sensor networks may be used in the above-described manner to provide business software applications with fast access to real-world data. In many instances, for example, smart items may include, or may be associated with, devices having local processing power, memory, and/or communication capabilities, and that are capable of providing data about the device and its properties, or information about a current state or environment of the smart item devices. Accordingly, for example, some such devices may be used in the execution of service components of back-end or underlying business applications, and, in particular, may do so in a collaborative way, e.g., by forming mobile ad-hoc networks to collect, process, or transmit business data.

Examples of smart items may include an RFID tag, which may be passive or active, and which may be attached to a physical object, as referenced above, and used to provide product or handling information related to the object. Other examples of smart items may include various sensors, such as, for example, environmental sensors (e.g., a temperature, humidity, or vibration sensor), which, as just referenced, may be capable of communicating to form one or more sensor networks. These and other types of smart items also may include embedded systems, which may refer generally to any system in which a special-purpose processor and/or program is included, and/or in which the system is encapsulated in the device being controlled.

Deployment of such devices may be constrained in several respects, including, for example, amounts of available processing power, energy, or bandwidth. For example, when networks of nodes are deployed across a physical location(s), the nodes may have insufficient transmission power or range to communicate directly with one another, or with a base station, in a single hop. Consequently, the nodes may relay communications to, in this example, a base station, by way of an intermediate node on the network, i.e., may use a multi-hop path.

However, due to the energy constraints just referenced, the nodes are not typically enabled to transmit data continuously, or whenever new data becomes available (e.g., whenever a sensor detects a new event or condition). Instead, the nodes are often programmed to save their data for intermittent transmission, and to otherwise stay in a sleep or low-power mode, during which no transmission occurs. A relation of the time during which the node is active (and transmission occurs) to the time during which the node is passive (and no transmission occurs) is often referred to as a duty cycle of the node. Thus, selection of the duty cycle reflects a trade-off between, for example, energy conservation and transmission delays. Further, when transmissions occur via the multi-hop paths referenced above, then coordination may be required between, for example, the node which generates the data and the relaying or intermediate node that re-transmits the data, for example, to a base station.

SUMMARY

According to one general aspect, a data packets from a network node may be monitored at a relay station associated with the network that is configured to forward the data packets to a base station. The network node may transmit the data packets according to a first duty cycle. At least one transmission parameter associated with transmission of the data packets from the network node to the relay station may be determined, and then may be related to at least one reference value to obtain a normalized transmission parameter. The normalized transmission parameter may be compared to a set-point value, and a duty cycle change command may be generated for the network node to forward subsequent data packets according to a second duty cycle, based on the comparison.

According to another general aspect, a system may be included in a relay station in communication with both a base station and a network of nodes. The system may include a packet monitor configured to receive data packets from a node of the network of nodes in accordance with a first duty cycle, a parameter extractor configured to extract at least one transmission parameter, based on the data packets, and at least one buffer configured to store values for the at least one transmission parameter. The system also may include normalization logic configured to relate the at least one transmission parameter to a reference value to obtain a normalized transmission parameter, and a controller configured to make a comparison of the normalized transmission parameter and a set-point value and generate a duty cycle change command based on the comparison.

According to another general aspect, a duty cycle manager may include an evaluation system configured to receive data packets from a node of a network of nodes in accordance with a first duty cycle, extract at least one transmission parameter, and relate the at least one transmission parameter to a reference value to obtain a normalized transmission parameter. The duty cycle manager also may include a duty cycle controller configured to make a comparison of the normalized transmission parameter to a set-point value, and to generate a duty cycle change command to change the first duty cycle to a second duty cycle, based on the comparison.

The details of one or more implementations are set forth in the accompanying drawings and the description below. Other features will be apparent from the description and drawings, and from the claims.

DETAILED DESCRIPTION

Figure 1:
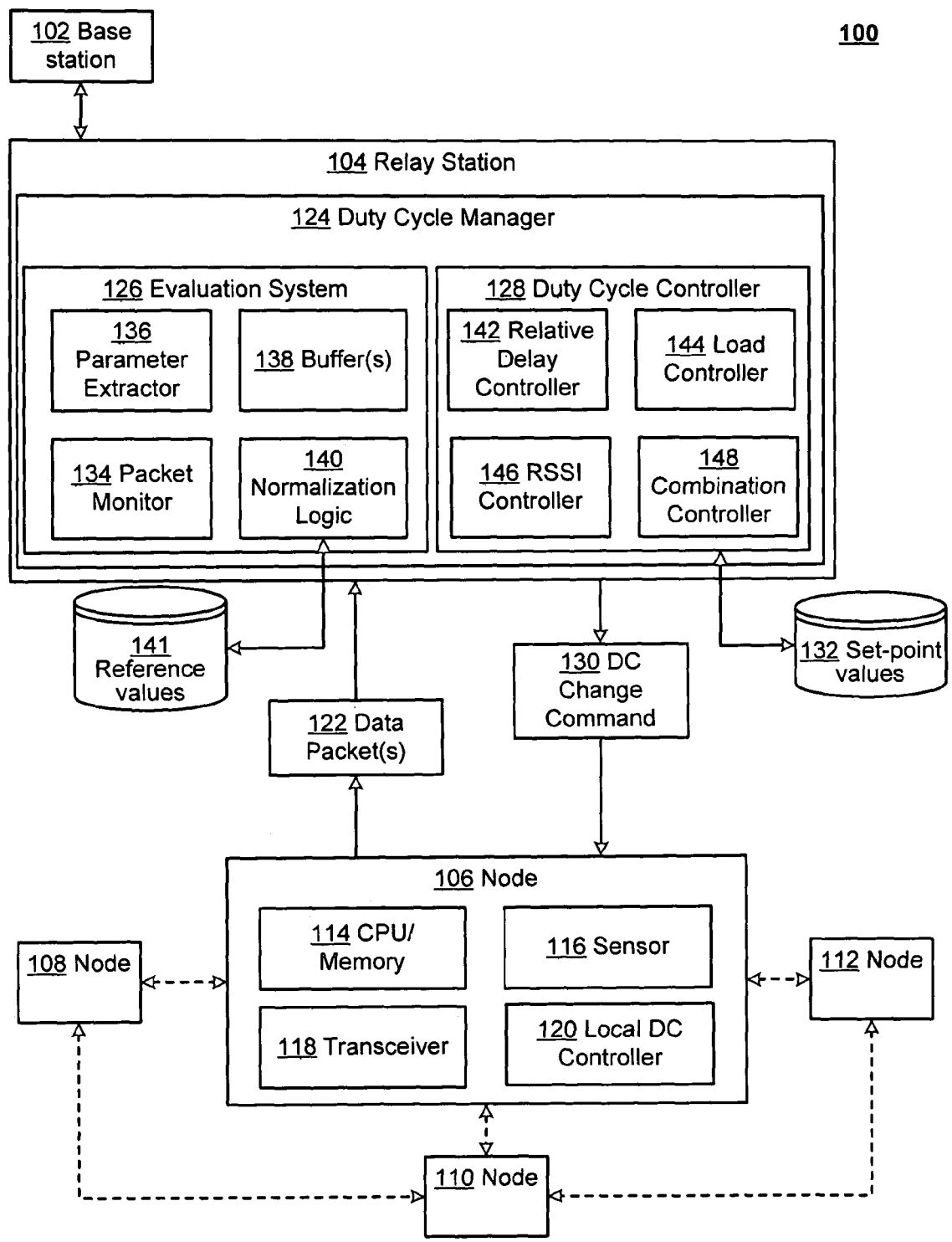
FIG. 1 is a block diagram of a system for duty cycle control for networks of nodes.

FIG. 1 is a block diagram of a system 100 for duty cycle control for networks of nodes. In FIG. 1, duty cycles of nodes within the networks of nodes may be optimized with respect to, for example, energy usage, transmission interference, transmission characteristics related to user behavior, or other transmission parameters. That is, a proportion of time that the nodes are active and transmitting, relative to the time that the nodes are passive and not transmitting, may be dynamically adjusted. Moreover, such adjustments may occur without requiring independent knowledge of a frequency with which new data is initially generated at an originating node. Consequently, for example, a lifetime and efficacy of the networks of nodes may be improved.

In the example of FIG. 1, a base station 102 represents a computing device that may receive information from a relay station 104, which itself may be configured to relay the information from a node 106. That is, the base station 102, the relay station 104, and the (originating) node 106, along with various other nodes that are represented in FIG. 1 as nodes 108, 110, 112, may form a network of nodes that are designed, for example, to provide real-world data to one or more business data processing systems, applications, or processes (not explicitly illustrated in FIG. 1), in a timely and accurate manner.

Examples of such business systems/applications/processes may include, for example, inventory management systems, supply chain management systems, retail store management systems, warehouse management systems, product life cycle management systems, and any other system(s) that may be used to execute business processes with respect to real-world objects. Such real-world objects may include, for example, products for sale, pallets or other shipment elements, patients, or manufacturing materials/equipment. Thus, the business processes, including those portions of the business processes deployed and executed at the local level of the real-world objects, may be used, for example, to determine inventory levels, set pricing levels, evaluate marketing strategies, evaluate manufacturing or production technologies, reduce theft, or maintain safety. As referenced herein, many other examples exist inside or outside of the business context, including, for example, systems designed to control physical values in an environment (e.g., in a building). Examples of such physical values may include temperature, humidity, and luminosity.

Thus, the base station 102 may represent a computing device having relatively extensive computing capabilities, compared, for example, to the relay station 104 and/or the nodes 106-112. For example, the base station 102 may represent a personal computer, laptop computer, server, handheld computer (e.g., a personal digital assistant (PDA)), or other computing device having sufficient resources to receive data from a plurality of relay station, and hence from an even larger number of individual nodes. For example, the base station 102 may be used to aggregate and process information collected by many different relay stations and associated nodes, in addition to the relay station 104 and nodes 106-112 of FIG. 1.

The relay station 104, as referenced above, may be used to relay information from the node 106 (and the nodes 108-112) to the base station 102. Such relaying functionality may be useful, for example, where the node 106 is too far away, and/or too energy-constrained, to communicate directly with the base station 102. Thus, instead of such a single-hop path, the node 106 may communicate with the base station 102 using a multi-hop path that involves one or more of the relay station(s) 104.

In operation, the relay station 104 may act as a coordinating node, while the node 106 may act as a subordinated node. In other words, the relay station 104 may be assigned the responsibility of dictating various parameters or operations of the node 106, including, for example, a frequency with which the node 106 transmits (e.g., controls a duty cycle of transmission of the node 106). As such, the relay station 104 may include or represent a node that is (otherwise) the same as, or similar to, the nodes 106-112, but that has been designated as a coordinating node for a particular reason or circumstance. For example, the relay station 104 may be selected as such due to being in an advantageous (e.g., central) location for coordinating transmissions of the larger network(s). In these or other examples, the relay station 104 may be designated as such due to having superior computing resources (e.g., processing power, memory, or power supply) than the nodes 106-112. In still other examples, the relay station 104 may represent a computing device such as those mentioned above with respect to the base station 102 (e.g., a personal computer or PDA).

The nodes 106-112 may represent, or be referred to as, for example, "smart items," "smart devices," "smart item devices," "motes," or other similar terms, which may be used similarly or interchangeably in various contexts. For example, the term "smart item" or "smart device" may refer to a device having local processing, storage, and communications capability, as referenced herein, or may refer to a combination of such a device and an object to which the device is affixed (e.g., a pallet containing merchandise for sale). Such devices and/or device/object combinations are referred to herein as "nodes" or "network nodes", for brevity and consistency.

In FIG. 1, the node 106 is illustrated as including a central processing unit (CPU) and memory 114. Thus, the node 106 should be understood to be capable of various levels of computing capabilities, including, for example, processing or transmitting sensed data. For example, the node 106 may include, or be associated with, a sensor 116, and the sensor 116 may be configured to detect various local events, circumstances, or conditions, including those referenced herein and others, such as, for example, a presence of a tagged object, or a local temperature, pressure, humidity, or vibration. In this description, the activity of the sensor 116 in performing a sensing operation and outputting a corresponding signal, indicator, result, or other data is referred to as an event, or a sensing event.

The node 106 also includes a transceiver 118 that allows the node 106 to communicate with the relay station 104, or with the nodes 108-112. As referenced below, such communication may occur according to known communications standards, and using other hardware components (e.g., an antenna) not specifically illustrated in FIG. 1.

Although also not specifically illustrated in FIG. 1 for the sake of clarity and brevity, it should be understood that the nodes 108-112 also may include the same or different computing capabilities as just referenced with respect to the node 106, including, for example, the capability to detect/sense-events and generate data based thereon, to execute business logic or other software, and to form and participate in local networks, such as wireless networks and/or peer-to-peer networks. That is, it should be understood that the nodes 106-112 may include other standard elements and features, not specifically illustrated in FIG. 1 for the sake of brevity, such as, for example, a local power supply (e.g., battery). Thus, the nodes 106-112 may be used, for example, to detect, collect, process, filter, aggregate, or transmit information that may be useful to related business processes. Consequently, although the below discussion is primarily given with respect to the node 106, it should be appreciated that such description is only for clarity and brevity, and that similar comments will apply to the nodes 108-112, or other nodes.

Techniques for communication between the base station 102, the relay station 104, and the nodes 106-112 may vary, for example, on the types of devices. For example, as referenced above, the devices and/or embedded systems may represent anything from small-scale, one-chip microcomputers, all the way to full-blown PC hardware. Thus, for example, the communication between the base station 102, the relay station 104, and the nodes 106-112 may utilize known communication standards, such as, for example, the IEEE 802.15.1 or the IEEE 802.15.4. The IEEE 802.15.4 standard uses, for example, a beacon-enabled mode in which synchronization may be enabled between nodes, e.g., between a coordinating node (in FIG. 1, the relay station 104) and the subordinated node (in FIG. 1, the node 106).

The node 106 is also illustrated as including a local duty cycle (DC) controller 120. As referenced above, and illustrated in more detail with respect to FIGS. 2A-2C, a duty cycle of the node 106 refers to how often the node 106 is active (transmitting) in relation to how often the node 106 is passive (not transmitting). The duty cycle may be expressed as a percentage, e.g., as in FIG. 2A, where, as discussed below, the duty cycle is 0.2 (or 20%). A higher duty cycle typically leads to higher energy consumption, since more time is spent in an active mode (in this sense "active mode" refers primarily to activity on layers related to data transmission, and not, for example, to activity of the sensor 116 itself in obtaining sensed values). While a lower duty cycle thus typically leads to conserved energy, it typically does so at the cost of imparting greater delays in the system, e.g., from a time that an event is sensed at the sensor 116 until the time that corresponding data regarding the event is received at the base station 102 or at the relay station 104.

Figure 4:
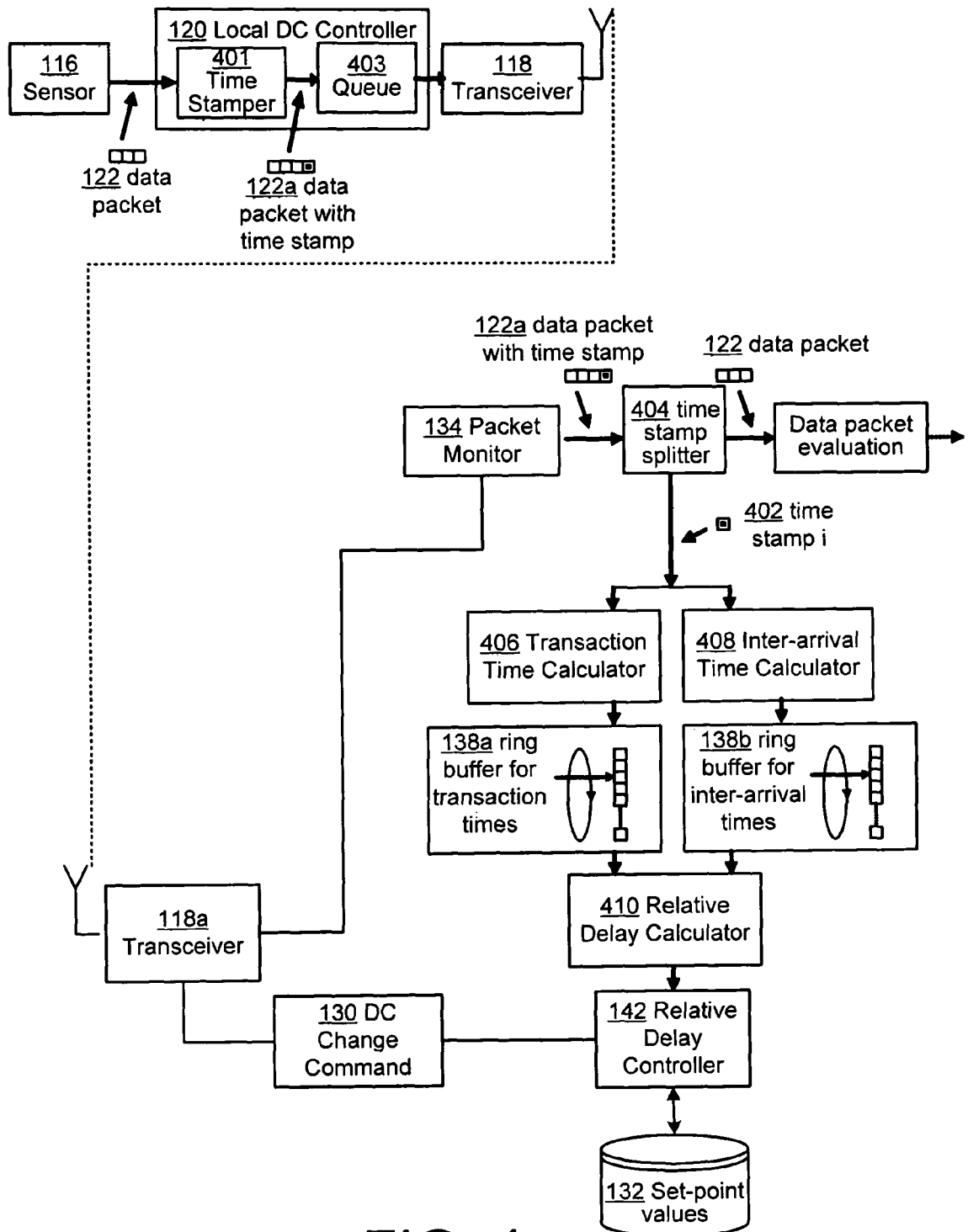
FIG. 4 is a block diagram of an example of the system of FIG. 1 using a relative delay controller.

In FIG. 1, the local DC controller 120 may be responsible for maintaining a state of the node 106 as either active or passive, e.g., waking the transceiver 118 or other appropriate components for transmission of data packets 122 to the relay station 104, where the data packets 122 correspond to, and describe, events generated by the sensor 116 in response to a sensed condition. In the described examples, the local DC controller 120 does not decide what the duty cycle should be, but, rather, acts as a subordinated node that implements a given duty cycle in response to a corresponding command from the relay station 104 (in the role of the coordinating node). For example, during a passive phase, the local DC controller 120 may save the data packets 122 (e.g., in a local buffer or queue, as shown in FIG. 4), until the current duty cycle indicates that an active phase should be entered and the data packets 122 should actually be transmitted. As referenced below, the local DC controller 120 also may provide information to the relay station 104 that the relay station 104 may use in determining how to set the duty cycle for the relay station 104 and for the node 106.

The relay station 104 benefits from appropriate scheduling (e.g., synchronization) with respect to the node 106, since the relay station 104 must also periodically alternate between active and passive states. For example, it would be sub-optimal if the relay station 104 became active during a time when the node 106 was passive, and, similarly, information may be lost if the relay station 104 is passive while the node 106 is active and transmitting.

Thus, the relay station 104 may be configured to set its own duty cycle, as well as a duty cycle of the node 106, e.g., in a synchronized or coordinated fashion therewith. In this regard, it should be appreciated that the relay station may include the same or corresponding elements shown for the node 106, e.g., a CPU, memory, transceiver, and software and/or hardware for controlling its own duty cycle for receiving the data packets 122 from the node 106, and for transmitting the same or related information to the base station 102.

The relay station 104 may include a duty cycle manager 124 that is responsible for determining, setting, and implementing the duty cycle for itself and for the node 106 (and for the nodes 108-112, and possibly other nodes). More specifically, the duty cycle manager 124 includes an evaluation system 126 that receives the data packets 122 for evaluation thereof, and a duty cycle controller 128 that receives results of this evaluation and determines a proper response, such as, for example, adjusting a duty cycle of the node 106 (and of the relay station 104) up or down.

In this regard, for example, the duty cycle controller 128 may issue a duty cycle (DC) change command 130 that instructs the node 106 (or, more specifically, the local DC controller 120) as to what its duty cycle should be. The DC change command 130 may include, for example, an explicit value (e.g., the 0.2 value referenced above), or may indicate that the local DC controller 120 should raise or lower a current value by a specified amount, or by a pre-designated amount.

In operation, the evaluation system 126 determines at least one transmission parameter associated with transmission of the data packets from the network node 106 to the relay station 104. As described below, such transmission parameters may include, for example, a number (count) of data packets 122 that arrive in a given time period, or an amount of transmission delay experienced by the data packets 122 from the node 106 to the relay station 104, or a signal strength indication. The evaluation system 126 relates the at least one transmission parameter to at least one reference value, to obtain a normalized transmission parameter.

The duty cycle controller 128 then uses this normalized transmission parameter(s) for comparison against a selected, appropriate set-point value(s) 132 that corresponds to the normalized transmission parameters. For example, as described in more detail below, the normalized transmission parameter may include a relative delay experienced by the data packets 122, and the set-point value 132 may include a set-point value desired by a designer of the system 100 for relative delay. Consequently, the duty cycle controller 128 may issue the DC change command 130 based on this comparison.

In more detail, the evaluation system 126 includes a packet monitor 134 that is configured to receive and monitor the data packets 122. A parameter extractor 136 is configured to extract one or more of the transmission parameters referenced above, or other transmission parameters. In so doing, the packet monitor 134 or the parameter extractor 136 may temporarily store values in one or more buffers 138. Normalization logic 140 may access reference values 141, and may be configured to relate the (buffered) transmission parameter(s) against corresponding reference values 141 in order to obtain normalized transmission parameters. If required by the duty cycle controller 128, the normalization logic 140 may use the buffers 138 to buffer a plurality of the normalized transmission parameters, as well.

As shown, the duty cycle controller 128 may use one or more different types or kinds of duty cycle control, and, as described in more detail below, the various types of duty cycle control may be selected or combined, as desired. In FIG. 1, the duty cycle controller 128 includes a relative delay controller 142, which is described in more detail below with respect to the examples of FIGS. 4-7. The duty cycle controller 128 also includes a load controller 144, which is described in more detail below with respect to the examples of FIGS. 8 and 9. The duty cycle controller 128 also includes a RSSI controller 146, which is described in more detail below with respect to the examples of FIGS. 10 and 11. Finally, the duty cycle controller 128 includes a combination controller 148, which may be configured to implement, for example, some combination of the relative delay controller 142, the load controller 144, and/or the RSSI controller 146, as described in more detail below with respect to FIG. 12.

Thus, depending on which type of controller(s) 142-148 is selected, the duty cycle controller 128 may access or otherwise determine normalized transmission parameters. For example, a relative delay experienced by the data packets 122 (specifically, for example, an average delay experienced by the data packets 122, normalized to an inter-arrival time of the data packets 122) may be determined, or a transmission load of the node 106 and/or the larger network, normalized to a maximum load value, or a RSSI related to, or normalized against, a percentage of time during which the RSSI is high (when compared to a threshold value).

Then, appropriate control techniques may be used to compare these normalized transmission parameters to the corresponding set-point values 132, for determination and generation of the DC change command 130. For example, a proportional controller (P-controller), or a proportional-integral-derivative controller (PID controller), may be used, possibly in the example manners that are described below.

Thus, FIG. 1 illustrates the system 100 as being capable of adjusting a duty cycle of the relay station 104 and/or node 106, based on the data packets 122 received from the node 106, and without requiring independent knowledge of a frequency or other aspect of the sensed events generated by the sensor 106. The system 100 is configured to operate based on high-value information, e.g., information that is calculated or derived over time, and then included directly into the described control loop(s) for the duty cycle of the node 106. Consequently, the system 106 may be particularly well-suited for contexts in which a high optimization of energy, interference, or other parameter is desired.

Figure 2A:
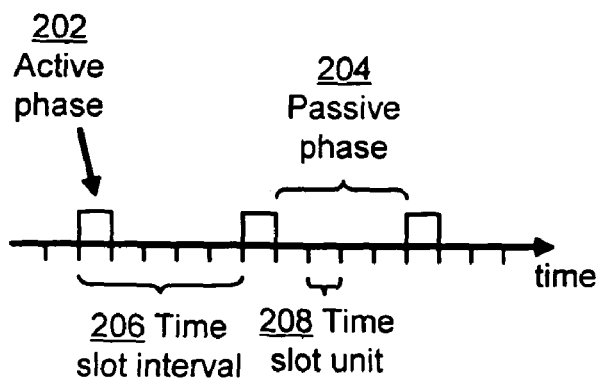
FIGS. 2A-2C are charts illustrating an operation and effect of the use of duty cycles in the networks of nodes of FIG. 1.
Figure 2B:
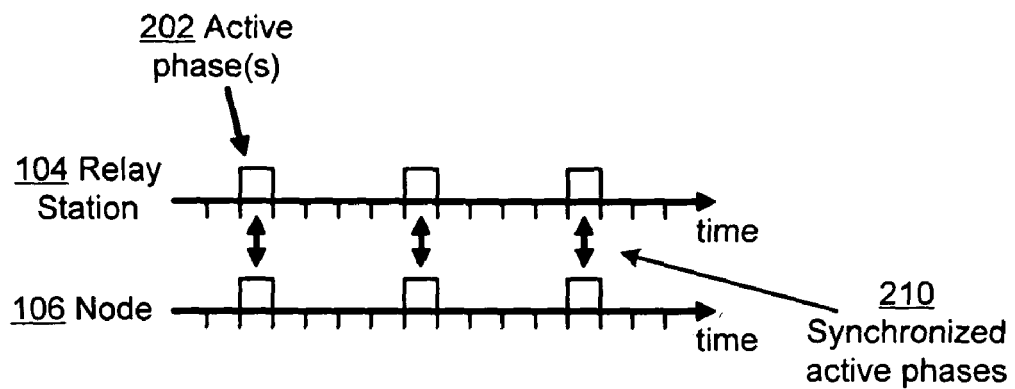
Figure 2C:
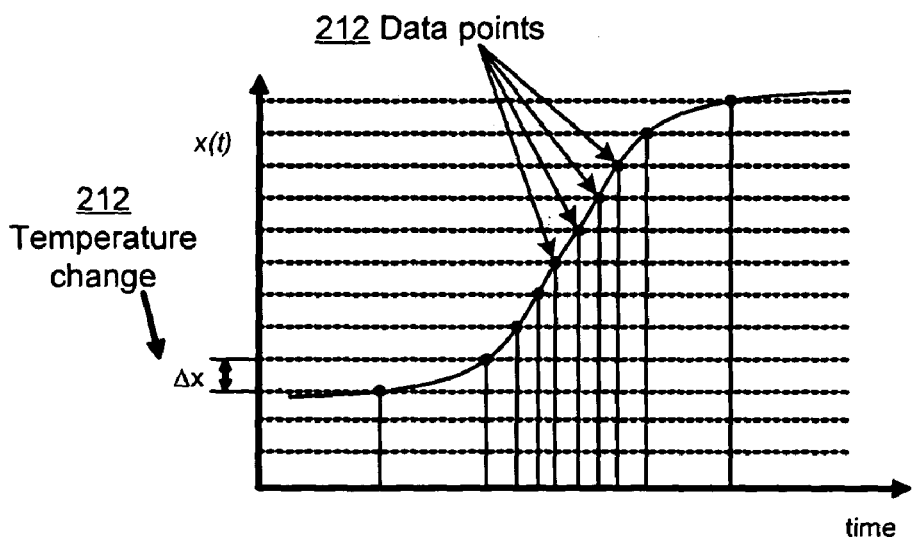

FIGS. 2A-2C are charts illustrating an operation and effect of the use of duty cycles in the networks of nodes of FIG. 1. FIG. 2A, as referenced above, illustrates an example including an active phase 202 and a passive phase 204. As shown, with respect to a time slot interval 206 comprising multiple time slots 208, the duty cycle of the example of FIG. 2A corresponds to 0.2, or 20%, of the time slot interval 206 (i.e., accounts for a single time slot unit 208 in a repeating pattern of five time slot units 208. In example implementations, the active phase 202 provides, in addition to transmission of the data packets 122, transmission of the DC change command 130 or other duty cycle control-related information.

FIG. 2B illustrates that the active phase(s) 202 being synchronized between the relay station 104 and the node 106, resulting in synchronized active phases 210. As described, for example, this synchronization allows for both the relay station 104 and the node 106 to be active at the same time, so that the data packets 122 and the DC change command 130 are transmitted/received while both are active to receive/send.

FIG. 2C illustrates that in the (subordinated) node 106, the data packets 122 are generated in response to sensed events. For example, if the sensor 116 is a temperature sensor monitoring a current temperature, then an event in this context may imply that a certain temperature range ($\Delta x$) was transcended, resulting in signaled temperature change 212. In the example of FIG. 2C, the temperature change 212 may be measured in relation to the last measured temperature. Further in FIG. 2C, data points 214 indicate points in time at which the data packets 122 are generated.

It should be appreciated from the example of FIG. 2C that such sensed events may be essentially unpredictable and/or random. For example, for the temperature-sensing scenario just referenced, a monitored temperature may change quickly as a heated object is moved into a vicinity of the sensor 116, or may stay essentially static for some period of time (thus generating few events). Consequently, the system 100 of FIG. 1 is useful in dynamically adjusting the duty cycles of the relay station 104 and the node 106 to be longer/more frequent in the first case, and to be shorter/less frequent in the second case, even without independent knowledge of the temperature changing events that are occurring in the vicinity of the sensor 116.

Figure 3:
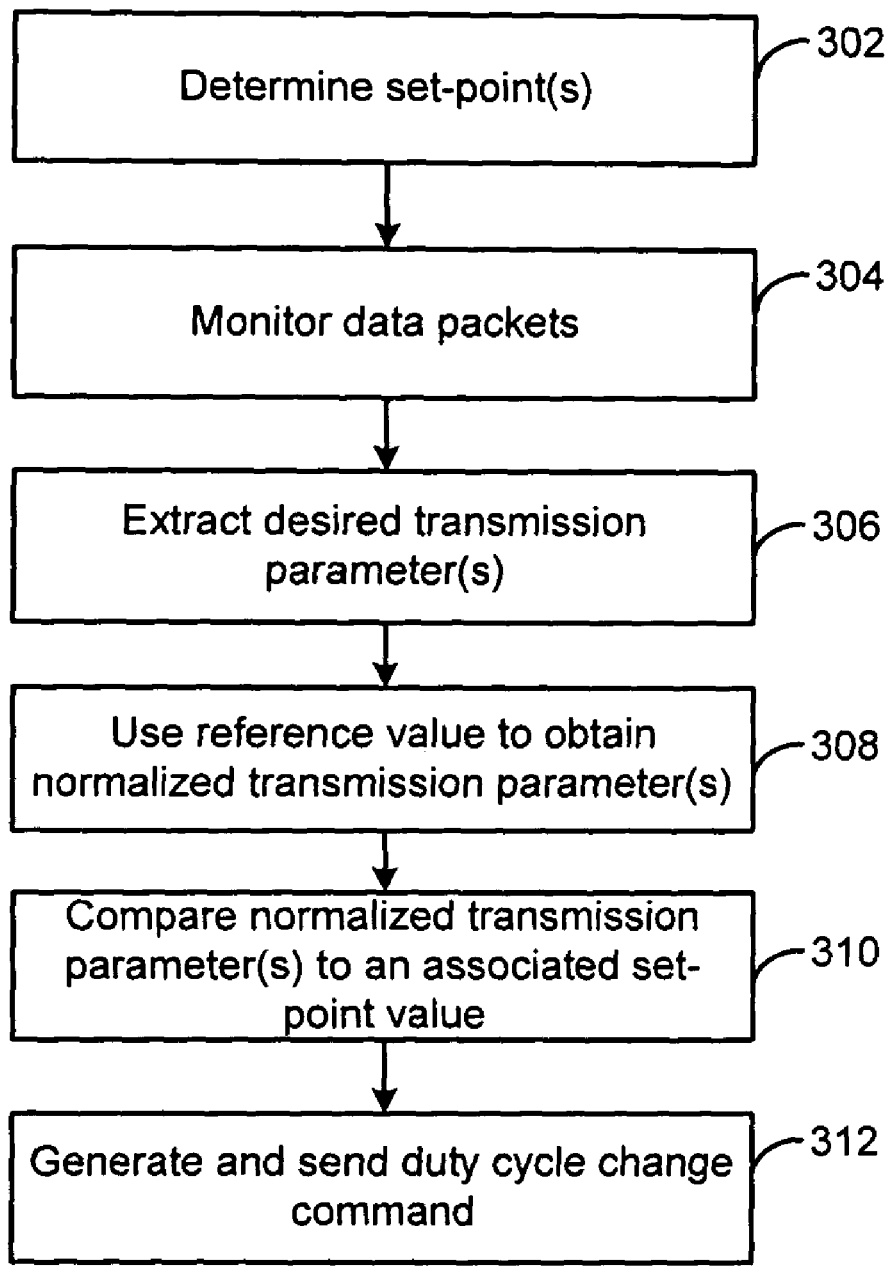
FIG. 3 is a flowchart illustrating examples of operations of the system of FIG. 1.

FIG. 3 is a flowchart 300 illustrating examples of operations of the system 100 of FIG. 1. In the example of FIG. 3, a set-point value(s) is determined (302). For example, the set-point values 132 may be determined and stored in a memory that is available to the duty cycle controller 128. Such set-point values may include, for example, a relative delay that is acceptable, or a load or RSSI over time that is acceptable, or some combination of these or other parameters.

The set-point values 132 may be selected by a user/designer of the network of nodes that includes the nodes 106-112, and may be changed dynamically if found to be suboptimal in a given circumstance. In other examples, data from the nodes 106-112, or other nodes, may be monitored and compared against some criteria, and the set-point values 132 may be selected and stored in an automated way. For example, a greater load on the system 100 (and corresponding higher set-point) may be tolerated if transmission conditions are found to be excellent, or may be lowered if transmission conditions deteriorate.

During operation of the system 100, data packets are monitored (304). For example, the packet monitor 134 may monitor the data packets 122 received from the node 106. In practice, the packet monitor 134 may receive data from all of the nodes 106-112, and may identify each data packet as being associated with a corresponding one of the nodes 106-112, e.g., based on a header of each data packet.

Desired transmission parameters may then be extracted (306). For example, the parameter extractor 136 may extract transmission parameters required by the relative delay controller 142, which, as explained in detail with respect to FIGS. 4-7, may include a transaction time (defined as the time difference between the event generation by the sensor 116 and reception of the data packet(s) 122 at the packet monitor 134), or an inter-arrival time (i.e., time between arrival of consecutive data packets 122).

In other examples, the parameter extractor 136 may similarly extract transmission parameters associated with the load controller 144 or the RSSI controller 146. During a set-up phase, the parameter extractor 136 may be provided with instructions on which transmission parameters to extract at a given time. The transmission parameters may be stored in the buffer(s) 138. For example, the last "n" values of the transmission parameters may be stored, or all values for a single (or multiple) active phase may be stored.

A reference value may be used to obtain normalized transmission parameters (308). For example, the normalization logic 140 may compare an extracted transmission parameter against a selected value from the reference values 141. The reference values 141, for example, may be absolute values that are known or assigned ahead of time, such as a maximum number (count) of packets that may be tolerated on the system 100 in a given time frame, or may represent a selected transmission parameter that is used as a reference value (such as when the relative delay controller 142 requires that the transaction time mentioned above is related to an inter-arrival time of consecutive packets). Thus, the reference values 141 may be stored in one of the buffer(s) 138, or may be stored in a separate memory that is accessible by the evaluation system 126. The normalized transmission parameters may be stored in one of the buffers 138.

The normalized transmission parameters may then be compared to an associated set-point value (310). For example, one or more of the relative delay controller 142, the load controller 144, or the RSSI controller 146 may retrieve associated, normalized transmission parameters from the buffer(s) 138, for comparison thereof against a selected value from the set-point values 132. In some instances, the normalized transmission parameters may be aggregated (e.g., averaged) before being compared to an associated set-point value.

Based on the comparison, a duty cycle change command may be generated and sent (312). For example, each one of the relative delay controller 142, the load controller 144, or the RSSI controller 146, or the combination controller 148, may be capable of generating the DC change command 130, which may dictate a new duty cycle for the relay station 104 and the node 106.

FIG. 4 is a block diagram 400 of an example of the system 100 of FIG. 1 using the relative delay controller 142. In FIG. 4, the sensor 116, the local DC controller 120, and the transceiver 118 of the node 106 are illustrated as exchanging transmissions with a corresponding transceiver 118a of the relay station 104. As shown, in this example, the local DC controller 120 includes a time-stamper 401 that is configured to add a time stamp 402 to the data packet 122, so as to obtain a time-stamped data packet 122a. Such time stamping may be configured to occur automatically, based on a generation of the data packet 122 in response to an event detected by the sensor 116. The time-stamped data packet 122a may then wait in a queue 403 for a next active phase of transmission of the transceiver 118.

The packet monitor 134 may be configured to receive the data packet 122a with time stamp 402 from the transceiver 118a, and a time stamp splitter 404 may be used to remove the time stamp 402 for forwarding, while also forwarding the original data packet 122 for further data evaluation (e.g., whatever conventional processing of the data packet 122 may occur, independent of the duty cycle adjustments discussed herein), as shown.

The time stamp 402 is illustrated as time stamp "i" to indicate a current time stamp, and is forwarded to a transaction time calculator 406 and an inter-arrival time calculator 408, as shown. As described in more detail below with respect to FIG. 6, the transaction time generally represents a time difference between a time of reception of the data packet 122a with time stamp 402 and a time of generation of the data packet 122, i.e., a difference between the reception time and the generation time (which, as should be apparent, may be influenced by a wait of the data packet 122a in the queue 403). Meanwhile, the inter-arrival time calculator 408 is configured to determine a time difference between an arrival of the current data packet 122a and the previous data packet 122a; i.e., the time difference between consecutive data packets 122a.

As may be appreciated from FIG. 1, the time stamp splitter 404, the transaction time calculator 406, and the inter-arrival time calculator 408 all may be considered to be part of the parameter extractor 136. Consequently, any of the time stamp 402, the transaction time, or the inter-arrival time may be considered to be examples of the transmission parameters referenced above with respect to FIG. 1.

As shown in FIG. 4, the transaction time may be stored in a ring buffer 138a, while the inter-arrival time may be stored in a ring buffer 138b, which are examples of the buffer(s) 138 of FIG. 1. After a designated period of time, a relative delay calculator 410 may be used to calculate a relative delay of the data packet 122 as the relationship between the transaction time and the inter-arrival time. In other words, the relative delay expresses information about an amount of delay (e.g., in the queue 403) that is acceptable relative to traffic (data) intensity, so that, for example, only a small delay may be accepted when a large number of data packets 122 are being generated, and a larger/more frequent active phase may result. Conversely, lower traffic intensity would indicate that a higher delay (i.e., smaller/less frequent duty cycle) may be acceptable.

Put another way, the relative delay may be considered to represent an average delay that is normalized to the inter-arrival time, so that the relative delay calculator 410 may be considered to be part of the normalization logic 140. In this example, then, the reference value 141 may be considered to be the inter-arrival time, which is itself a transmission parameter saved in the ring buffer 138b.

The relative delay controller 142 thus receives the relative delay for comparison to the corresponding set-point value 132, and, based on the comparison, is configured to generate the DC change command 130, which is then transmitted to the transceiver 118 of the node 106 by the transceiver 118a of the relay station 104.

Figure 5:
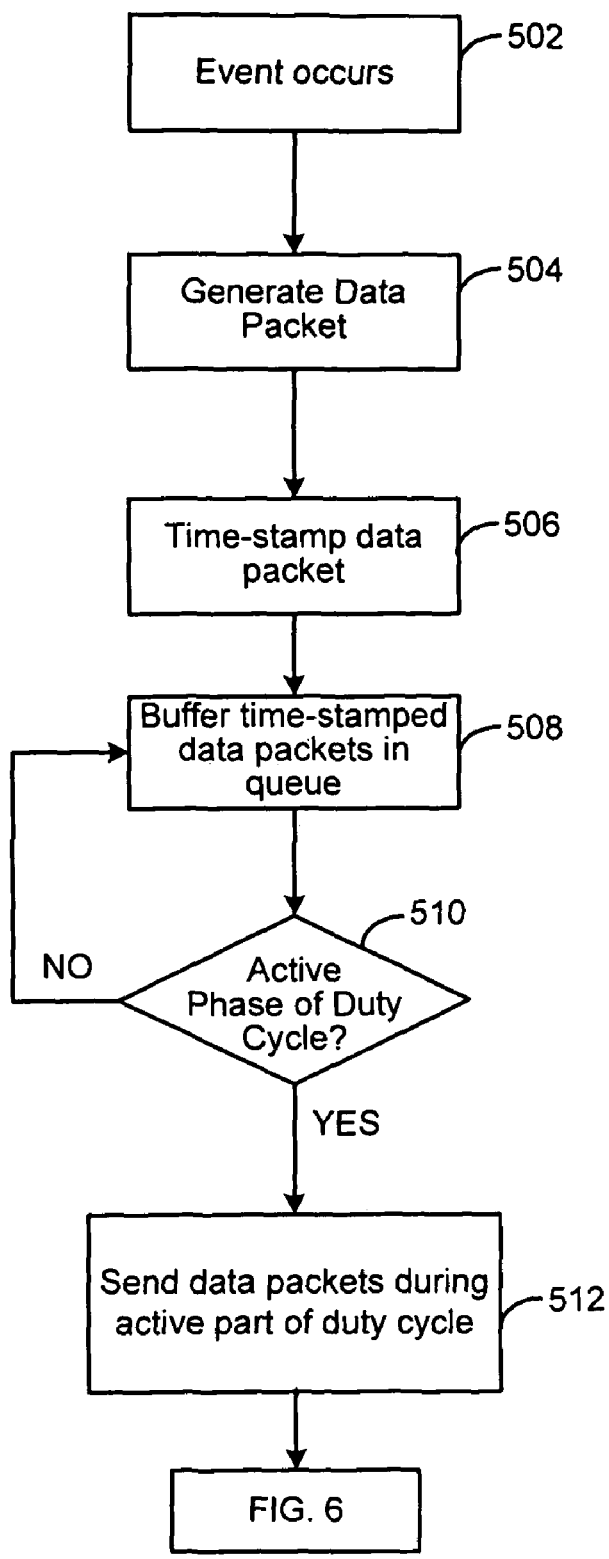
FIG. 5 is a first flowchart illustrating examples of operations of the system of FIG. 4.

FIG. 5 is a first flowchart 500 illustrating examples of operations of the system 400 of FIG. 4. More specifically, the flowchart 500 illustrates examples of operations of the local DC controller 120 of the node 106.

In the example of FIG. 5, an event occurs (502). For example, the sensor 116 may detect a temperature or other condition or change in condition for which it is configured to detect. Consequently, a data packet may be generated (504). For example, the sensor 116 may generate the data packet 122.

The data packet may then be time-stamped (506), such as when the time stamper 401 is used to time-stamp the data packet 122. The time-stamped data packet(s) 122a may then be buffered (508), e.g., in the queue 403. If an active phase of the duty cycle of the node 106 is not occurring (510), such as during the passive phase 204 of FIG. 2A, then the time-stamped data packets 122a are delayed in the queue 403. If the active phase is occurring, or once the active phase starts, such as when the active phase 202 of FIG. 2A starts (510), then the time-stamped data packets 122a may be sent (512). For example, the local DC controller 120 may send the time-stamped data packets 122a to the transceiver 118 for transmission to the relay station 104.

Figure 6:
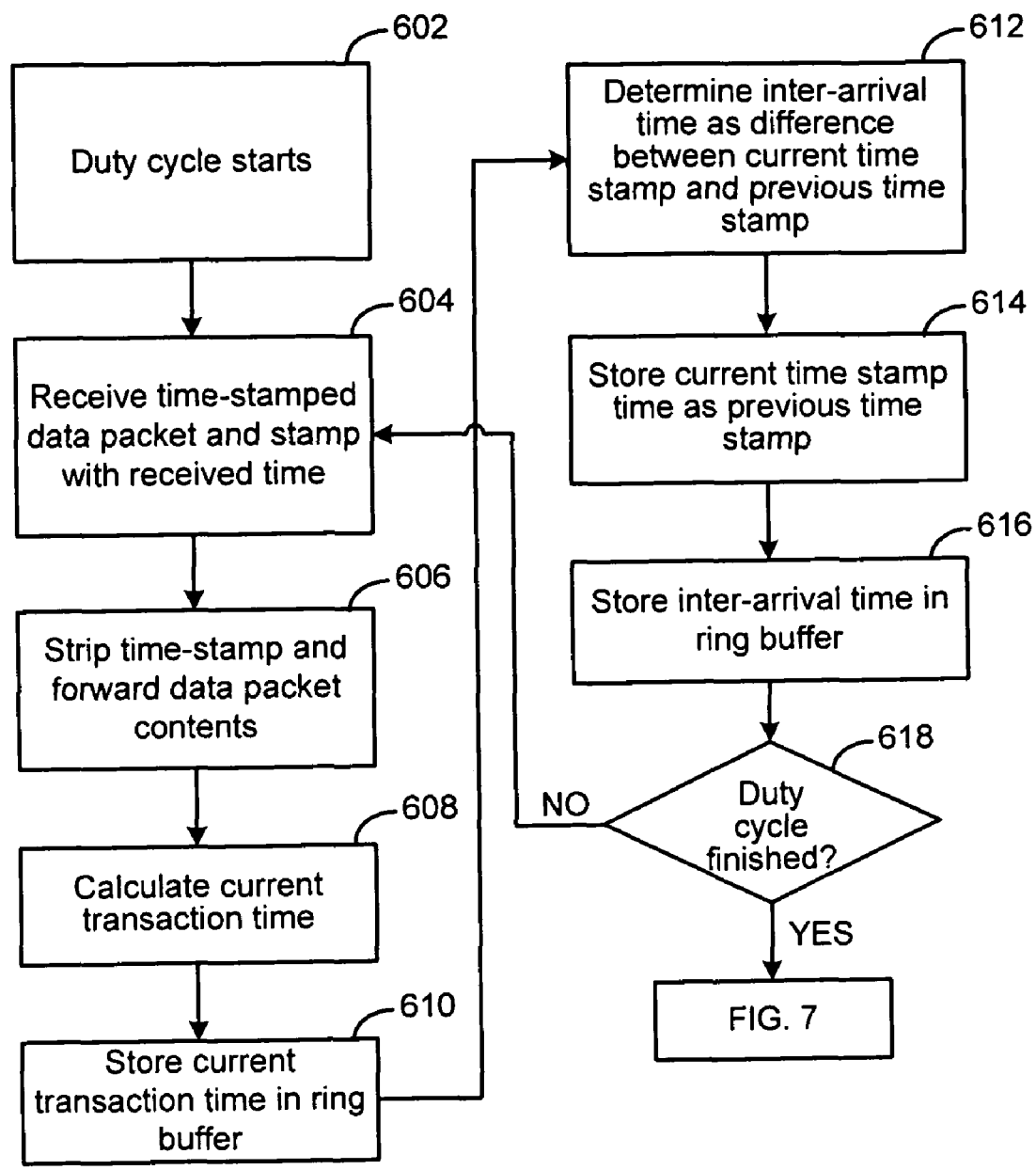
FIG. 6 is a second flowchart illustrating examples of operations of the system of FIG. 4.

FIG. 6 is a second flowchart 600 illustrating examples of operations of the system 400 of FIG. 4. More specifically, the flowchart 600 illustrates examples of operations of the relay station 104 in receiving the time-stamped data packets 122a from the operation of FIG. 5.

In the example of FIG. 6, a duty cycle of the relay station 104 starts (602), i.e., the transceiver 118a enters an active phase. Thereafter, the relay station 104 receives the time-stamped data packets 122a and stamps them with the received time (604). For example, the transceiver 118a and the packet monitor 134 may receive the time-stamped data packets 122a. As part of this operation, a received time stamp, indicating a time of reception of the data packet 122a also may be associated with the (stripped) data packet 122. For example, the packet monitor 134 may add or determine a received time for each of the data packets 122a.

The time stamp may thus be stripped, and the data packet forwarded (606). For example, the time stamp splitter 404 may perform these actions, as shown in FIG. 4, as part of the operations of the parameter extractor 136 of FIG. 1.

Then, a current transaction time may be calculated (608). For example, the transaction time calculator 406 may determine the current transaction time as the difference between the stripped time stamp 402 and the received time stamp added by the packet monitor 134. Thus, the transaction time represents a time from generation to reception of the data packet 122, including a time spent waiting in the queue 403 of the node 106. The current transaction time may then be stored in a ring buffer (610), such as the ring buffer 138a.

Meanwhile, a difference between the current (stripped) time stamp "i" 402 and a previous stripped time stamp 402 "i−1" (from a previous one of the data packets 122a) may be determined (612). For example, the inter-arrival time calculator 408 may perform this calculation. Then, the current (stripped) time stamp 402 "i" may be stored (in a separate memory, not shown) as the new, previous time stamp "i−1," (614) in order to allow repetition of the process for the next data packet 122a. Further, the calculated inter-arrival time may be stored in a ring buffer (616), such as the ring buffer 138b.

If the current duty cycle active phase has not ended (618), then the process continues with the next incoming data packet 122a (604). Otherwise, at the end of the duty cycle (618), then the relative delay may be calculated by, or for use by, the relative delay controller 142, as shown in FIG. 7.

Figure 7:
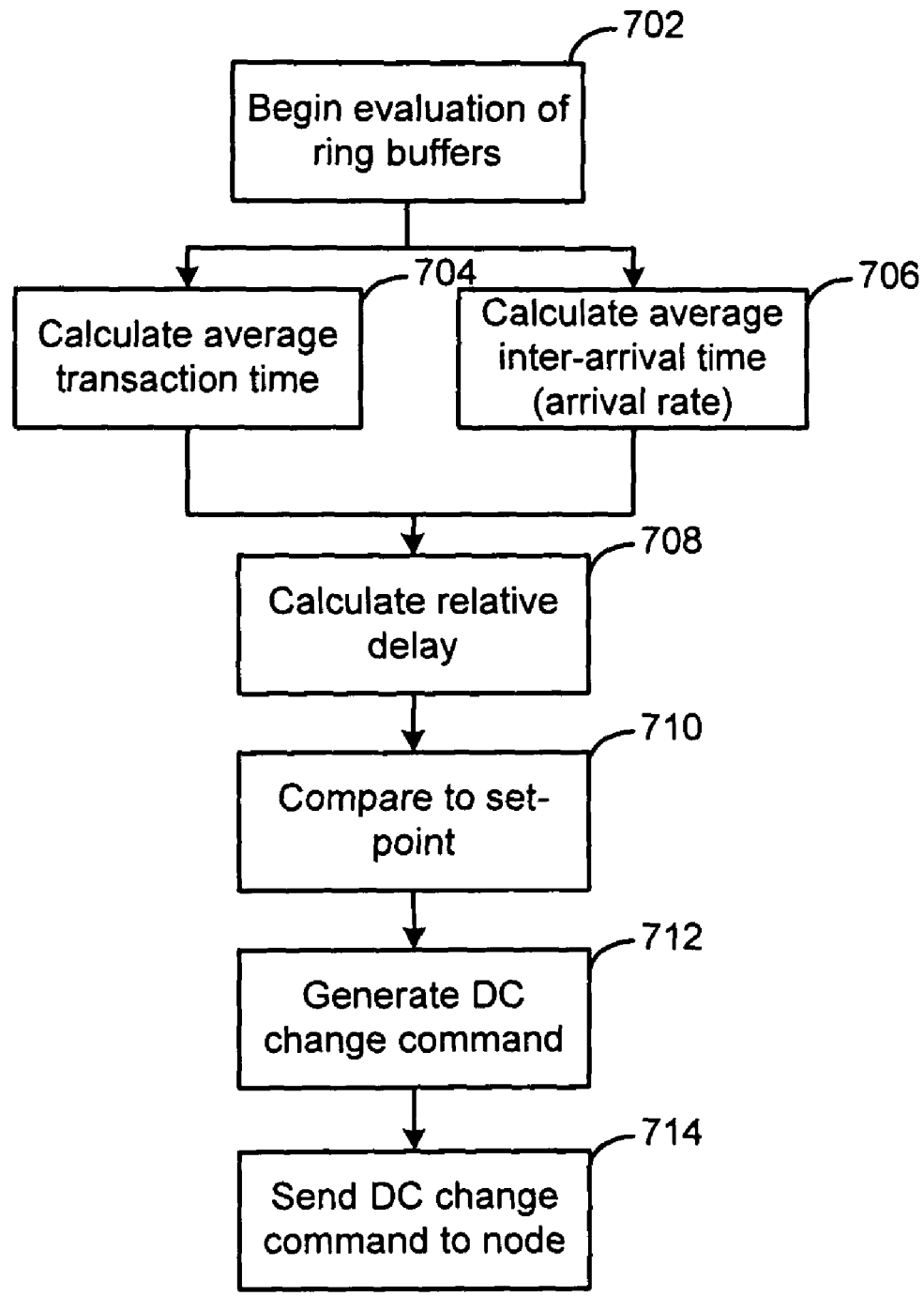
FIG. 7 is a third flowchart illustrating examples of operations of the system of FIG. 4.

FIG. 7 is a third flowchart 700 illustrating examples of operations of the system 400 of FIG. 4. More specifically, FIG. 7 illustrates operations associated with, or performed by, the relative delay controller 142 of FIG. 1.

In the example of FIG. 7, evaluation of the ring buffers, e.g., the ring buffers 138a, 138b, begins (702). For example, the relative delay calculator 410, which, as referenced above, may be considered as part of the normalization logic 140, may read out the last "n" values of the transaction time values from the ring buffer 138a, and may therewith calculate the average transaction time (704). Meanwhile, the relative delay calculator 410 also may read out the last "n" values of the inter-arrival time values from the ring buffer 138b, and may therewith calculate the average inter-arrival time (706).

In practice, the value "n" may be determined to be sufficiently larger than the number of data packets in each active phase to provide a meaningful average value for each of the transaction time and the inter-arrival time. Thus, it may be appreciated that this number may necessitate operation of the flowchart 600 of FIG. 6 over more than one complete duty cycle.

The relative delay may be calculated as the relationship of these two quantities (708), i.e., as the relationship of the average transaction time to the average inter-arrival time. Accordingly, the calculated relative delay may be compared to the relative delay set-point from the set-point values 132 (710). For example, the relative delay controller 142 may receive the relative delay from the relative delay calculator 410, and may computer a system deviation defined by a difference between the calculated relative delay and the relative delay set-point.

Then, the DC change command may be generated (712), based on this comparison. For example, the relative delay controller 142 may compute a new set value for the duty cycle(s) of the relay station 104 and the node 106, as a value equal to a constant (Ksys) multiplied by the system deviation just determined. The product of these terms may define the DC change command 130. Here, the constant Ksys may be determined based on factors associated with the system(s) 100/400, and on the transmission technology (e.g., which communications standard is being used). Further, due to the normalization of the transmission parameters as described herein, the system deviation may be normalized, as well. For example, a relatively low value for Ksys (e.g., 0.1) may result in a slower changing of the duty cycle, whereas a relatively high Ksys (e.g., 2) would then result in a faster changing of the duty cycle. Thus, it may be seen that a selected value for the parameter Ksys may depend on the corresponding desired behavior in the application itself.

Finally in FIG. 7, the DC change command 130 is sent to the node 106 (714). For example, the relative delay controller 142 may send the DC change command 130 to the transceiver 118a, for forwarding to the transceiver 118 of the node 106. Other control techniques may be implemented by the relative delay controller 142, including those described herein, as would be apparent. Further, as shown in FIG. 2B, the same (synchronized) duty cycle may be implemented by the relay station 104, as well.

Figure 8:
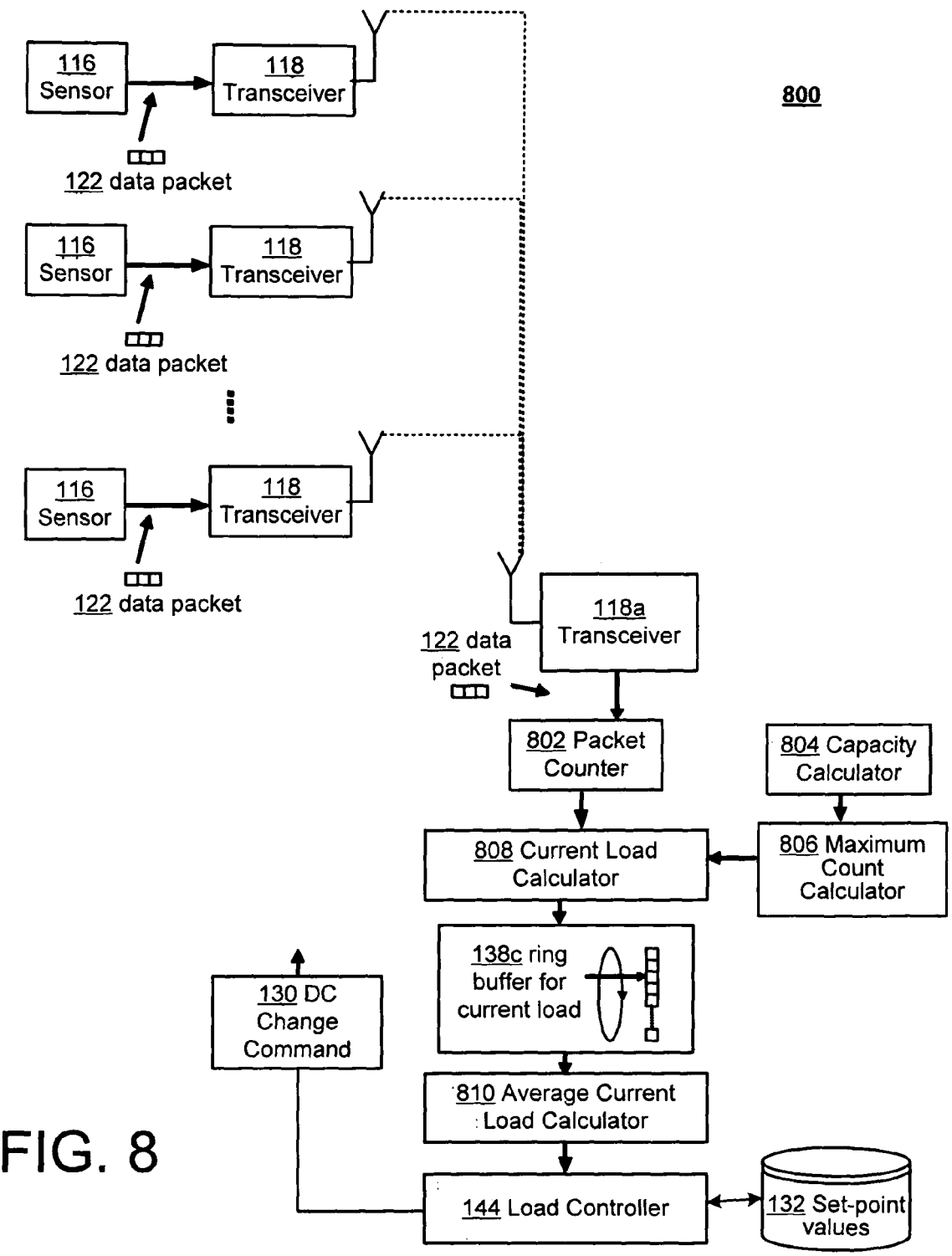
FIG. 8 is a block diagram of an example of the system of FIG. 1 using a load controller.

FIG. 8 is a block diagram 800 of an example of the system of FIG. 1 using the load controller 144 of FIG. 1. In FIG. 8, the duty cycle may be determined based on a current load of the larger network of nodes 106-112 (or other nodes), so that when a load of the network is determined to be high, the active phase may be increased in length or made more frequent, and when a load of the network is determined to be low, the active phase may be decreased in length or made less frequent.

In the example of FIG. 8, a packet counter 802 counts incoming data packets 122 from a number of nodes and outputs a packet count over a period of time. A capacity calculator 804 determines a transmission capacity for the relevant transmission technology (e.g., IEEE 802.15.4) in terms of data packets per time unit. For example, in IEEE 802.15.4 there is an active phase that lasts at least 15.36 ms at 2.4 GHz, and within this active phase a certain number of packets may be transmitted, assuming no other limitations are in place (e.g., collisions with other packets). This capacity may be calculated (at least approximately), either at or before runtime of the system.

A maximum count calculator 806 uses the calculated capacity to determine a maximum count of data packets that may be transmitted through the entire channel, which, for each active phase, depends on the length of the active phase and as well as the calculated capacity. Then, a current load calculator 808 normalizes the packet count by relating it to the maximum count to determine the relation of the used capacity to the maximum capacity. Then, the current load values over an active phase may be saved in a ring buffer 138c, and an average current load calculator 810 may be configured to determine an average current load over the time period(s) of interest.

Meanwhile, a load set-point value may be determined as a percentage of the maximum load (e.g., 30%). When this percentage is lower, transmissions occur less frequently, but are more likely to reach their destination, while higher percentage indicate the inverse (transmissions occur more often, but are more likely to suffer from collisions and not reach their destination). Consequently, the load controller 144 may compare the average current load to the load set-point value from the set-point values 132 and issue the DC change command 130.

For example, the P-controller or PID controller mentioned above may be used. For example, the P-controller may determine a system deviation between the average current load value and the load set-point value. Then, a value for setting the new duty cycle may be determined as being equal to a constant (Ksys) multiplied by this system deviation, where, as referenced above, the constant Ksys represents a constant selected based on relevant factors for the system(s) in question and for the transmission technology being used.

In FIG. 8, it may be appreciated that the packet counter 802 may be considered to be an example of the parameter extractor 136 of FIG. 1, which is configured to extract the transmission parameter of how many data packets 122 are being transmitted on the channel at any given time. Meanwhile, the capacity calculator 804, the maximum count calculator 806, the current load calculator 808, and the average current load calculator 810 may be considered to represent examples of the normalization logic 140. Specifically, the maximum count may be considered to be an example of the reference value(s) 141 of FIG. 1.

Figure 9:
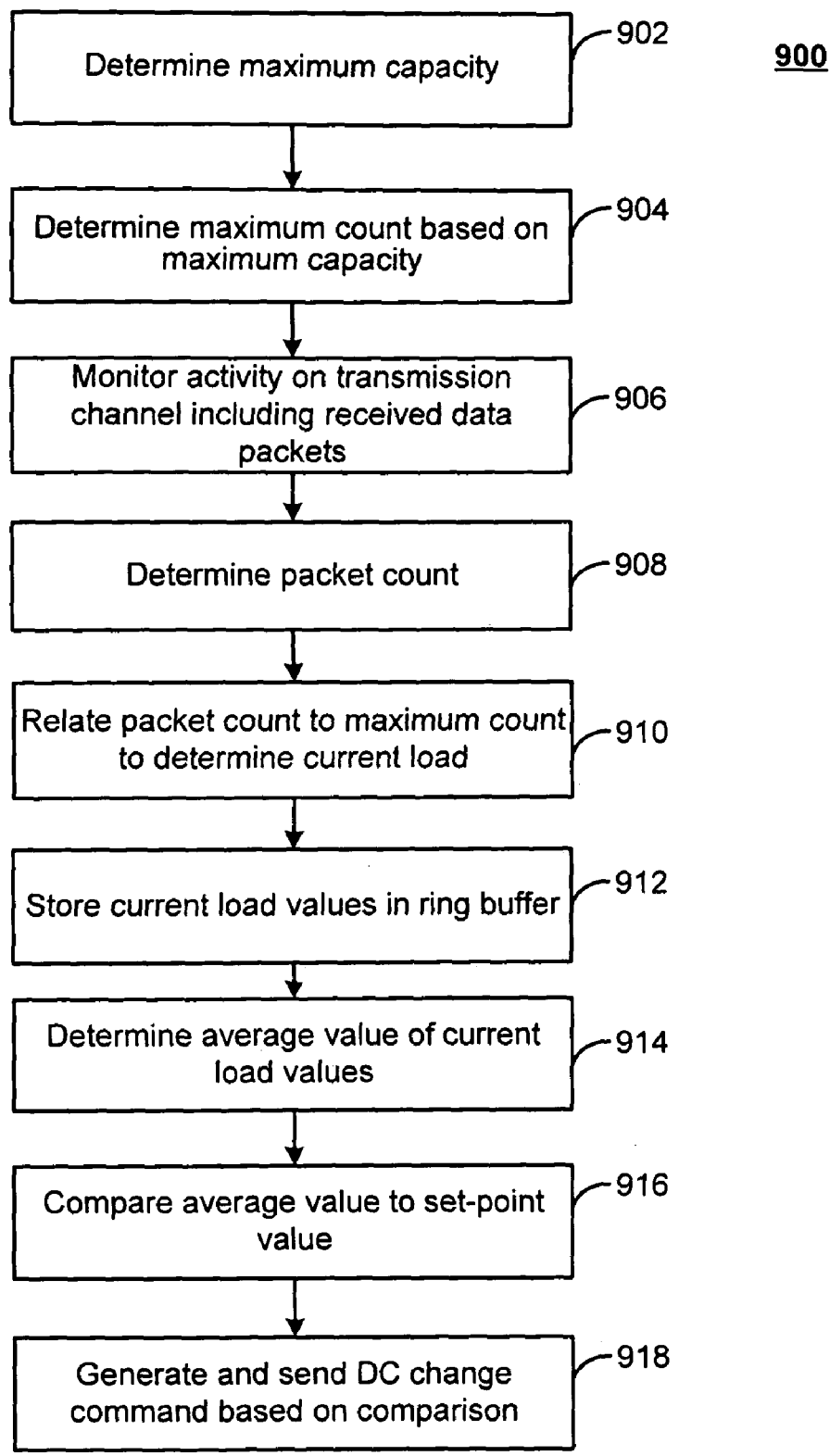
FIG. 9 is a flowchart illustrating examples of operations of the system of FIG. 8.

FIG. 9 is a flowchart 900 illustrating examples of operations of the system of FIG. 8. In FIG. 9, a maximum capacity is determined (902), such as by the capacity calculator 804. The maximum capacity may be related to a maximum packet count (904).

Then, activity on the transmission channel may be monitored, as data packets are received from a plurality of nodes (906), as shown in FIG. 8. From this monitoring, a packet count may be determined (908), e.g., by the packet counter 802).

The packet count may be normalized or related to the maximum count to determine a current load value (910), e.g., by the current load calculator 808. After storing a sufficient number of current load values in a ring buffer (912), e.g., the ring buffer 138c, then, for example, the average current load calculator 810 may determine the average current load (914). Then, for example, the load controller 144 may compare this average value to a corresponding load set-point value (916), and generate/send the DC change command 130 based on the comparison (918).

Figure 10:
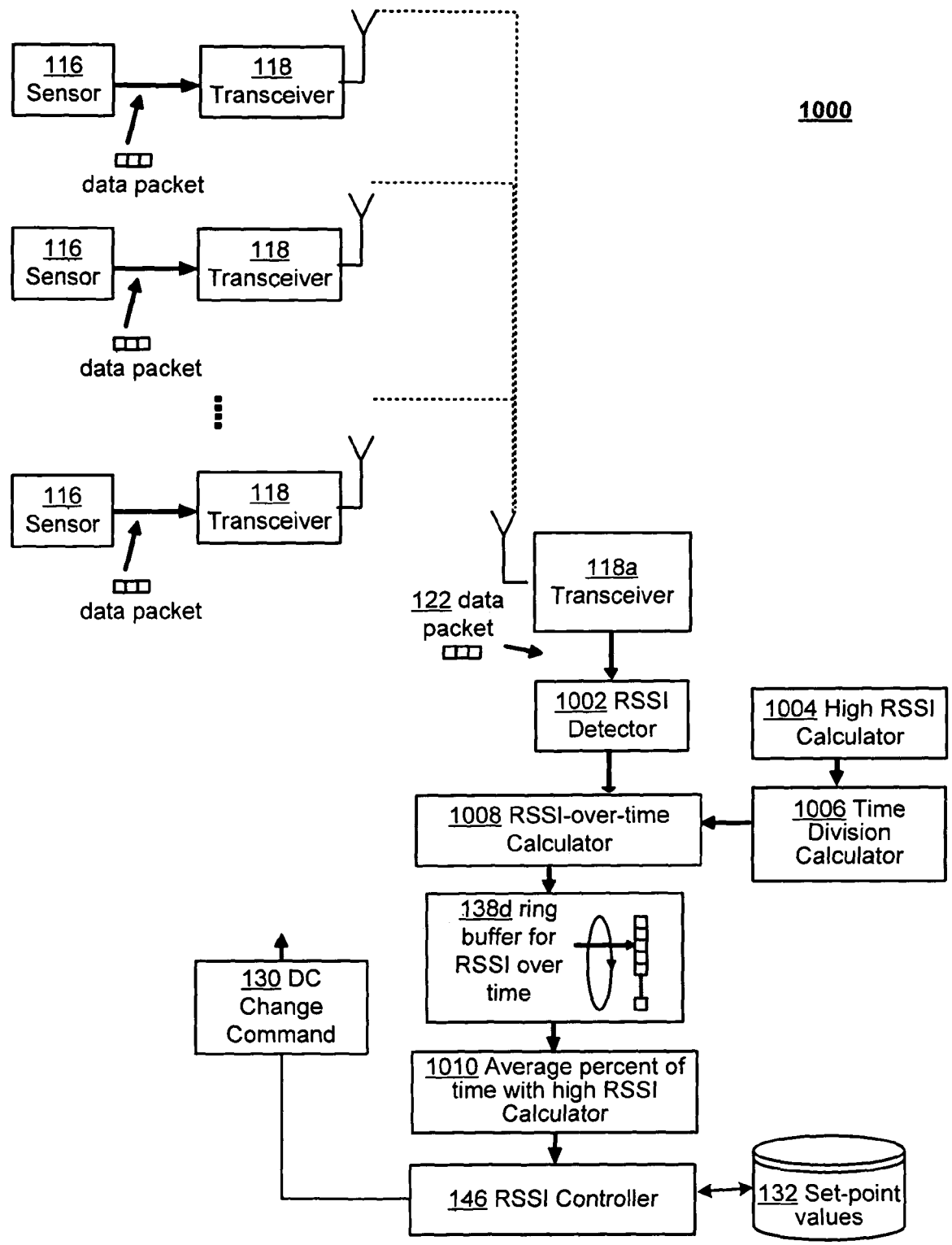
FIG. 10 is a block diagram of an example of the system of FIG. 1 using a relative signal strength (RSSI) controller.

FIG. 10 is a block diagram 1000 of an example of the system of FIG. 1 using a relative signal strength (RSSI) controller. As referenced above, RSSI refers to a measurement or indication of a received signal strength or energy that can be detected by a receiver. When RSSI in the channel(s) is low, then additional data packets 122 may be sent with a high expectation of reaching their destination (other factors being equal). RSSI may be expressed using a numerical scale of 0 to some maximum value, e.g., between values of 0 to 255, or 0 to 100, or 0 to 60.

In practice, the RSSI over a period of time may be equal to or larger than the RSSI implied by the actually-received data, and describes only the energy on the medium. For example, if many nodes attempt to transmit over one channel, then packet collisions may occur. Consequently, an RSSI-over-time may be high over some relatively large period of time, even though a relatively smaller number of the data packets 122 are transmitted (e.g., due to the collisions).

In FIG. 10, a RSSI detector 1002 determines the RSSI on the relevant channel(s). Meanwhile, a high RSSI calculator 1004 determines a point at which RSSI is considered to be undesirably high, e.g., a point on one of the scales mentioned above. Then, a time division calculator 1006 may determine time divisions over which to measure the RSSI. Accordingly, a RSSI-over-time calculator 1008 may determine a percentage of time, using the given time divisions, over which RSSI is high, and these percentages may then be stored in a ring buffer 138d (similarly to the current load stored in the ring buffer 138c of FIG. 8).

Consequently, an average of the percentage(s) of time that RSSI is high may be determined with corresponding calculator 1010. Then, the RSSI controller 146 may compare this average percentage against a corresponding RSSI set-point value to determine a system deviation therefrom, which then may be used to generate the DC change command 130.

As appreciated from the description of FIGS. 1 and 10, the RSSI detector 1002 may be considered to be an example of the parameter extractor 136 (and possibly the packet monitor 134). Meanwhile, the elements 1004-1010 may be considered to be examples of the normalization logic 140.

Figure 11:
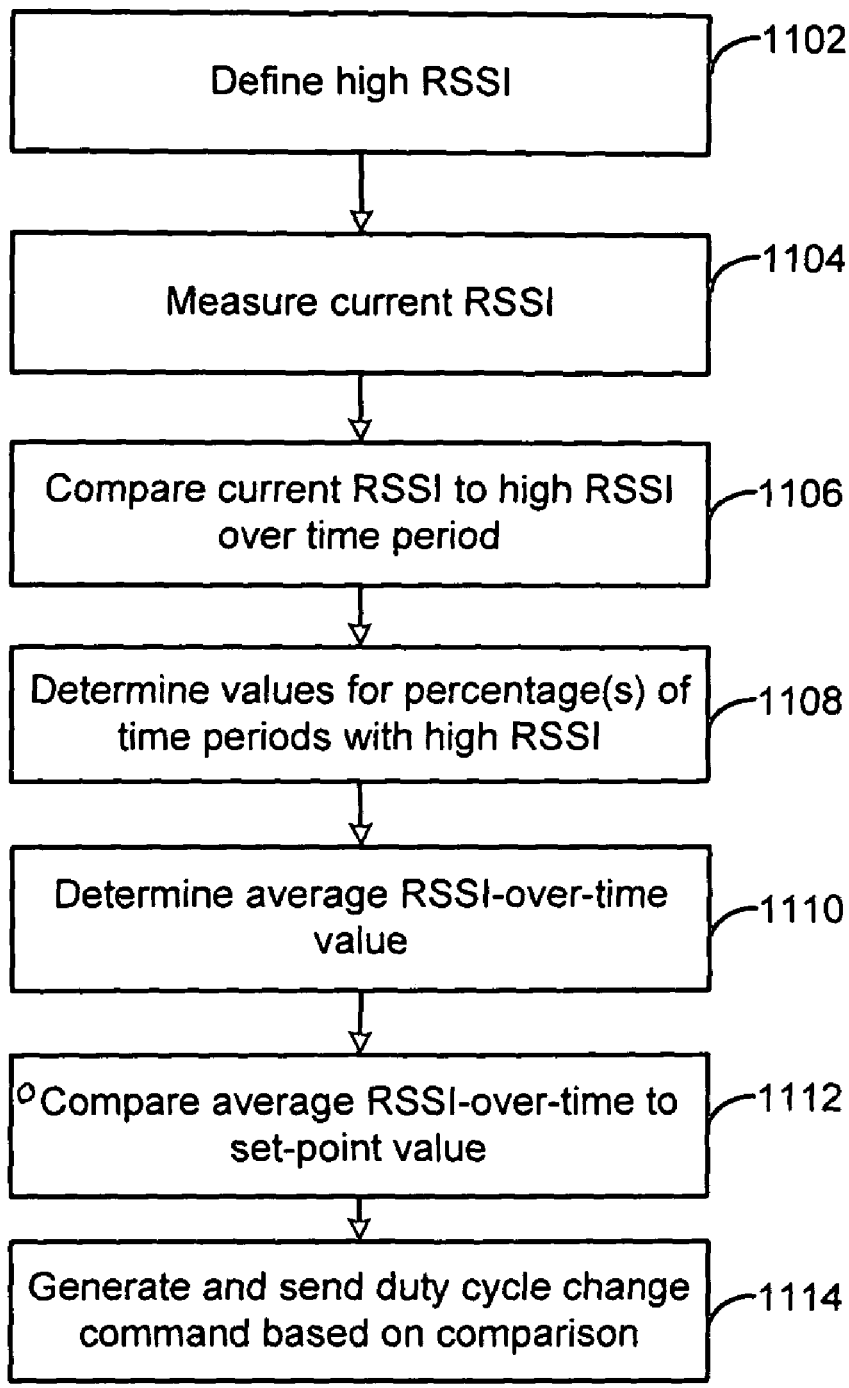
FIG. 11 is a flowchart illustrating examples of operations of the system of FIG. 10.

FIG. 11 is a flowchart 1100 illustrating examples of operations of the system of FIG. 10. In FIG. 11, a high RSSI may be defined (1102), e.g., using one of the scales mentioned above, or other criteria. A current RSSI may be measured (1104), e.g., using the RSSI detector 1002. Then, the current RSSI may be compared to the high RSSI over relevant time periods (1106), in order to determine percentages of the time period(s) with high RSSI (1108), which then may be stored in the ring buffer 138d. For example, the RSSI-over-time calculator may perform these calculations, using values from the high RSSI calculator 1004 and the time division calculator 1006.

Thus, an average RSSI-over-time value may be calculated (1110). For example, the calculator 1010 may determine the average percentage of time during which the RSSI-over-time is high. This value may be compared to the corresponding set-point value (1112) to determine a corresponding system deviation, which then may be used to generate/send the DC change command 130 (1114).

Figure 12:
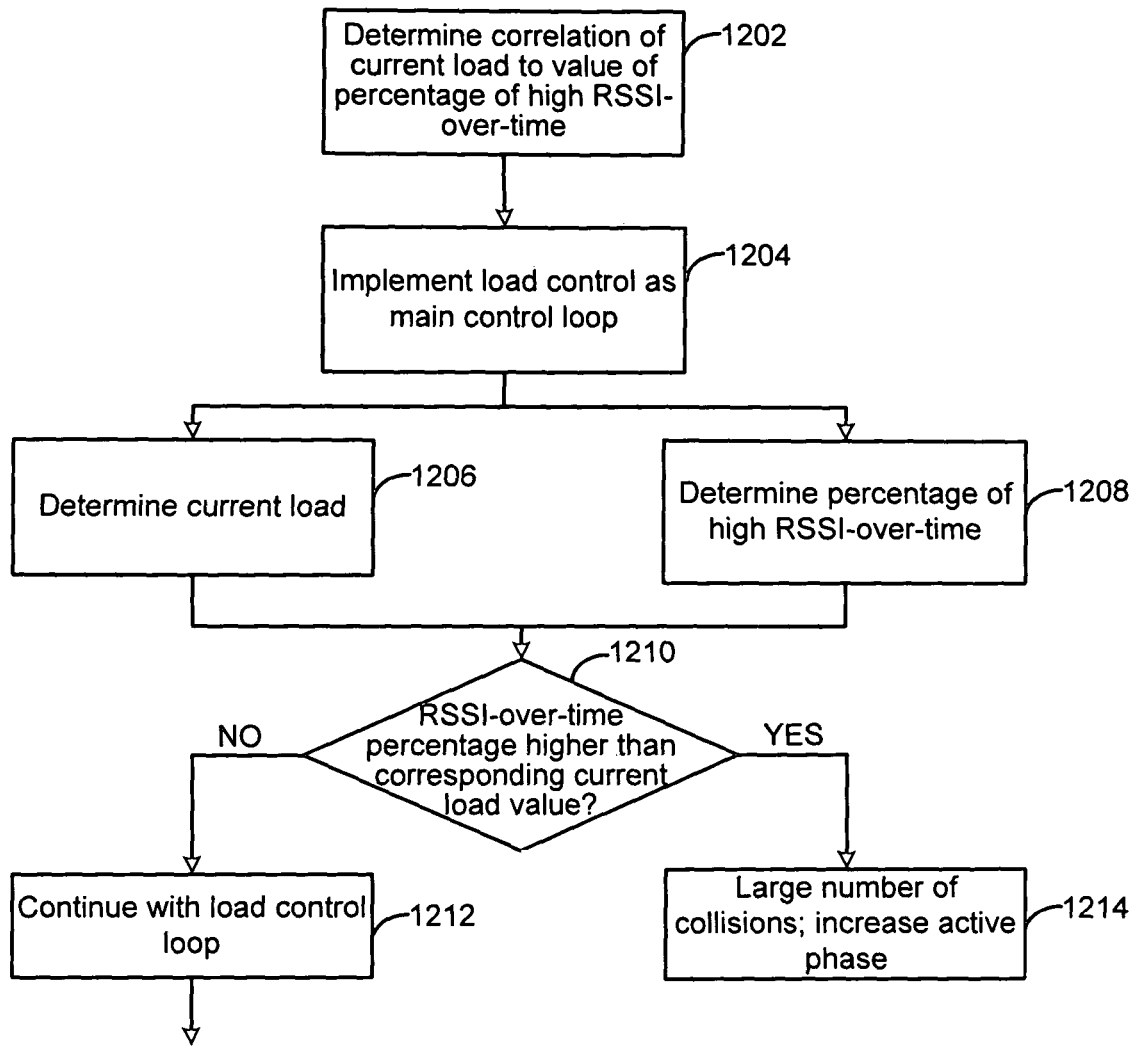
FIG. 12 is a flowchart illustrating examples of operations of the system of FIG. 1 using combinations of one or more of the relative delay controller, the load controller, and the RSSI controllers of FIGS. 4, 8, and 10, respectively.

FIG. 12 is a flowchart illustrating examples of operations of the system of FIG. 1 using combinations of one or more of the relative delay controller 142, the load controller 144, and the RSSI controller 146 of FIGS. 4, 8, and 10, respectively. Thus, FIG. 12 provides an example of the operation of the combination controller 148 of FIG. 1.

In general, and as referenced above, the combination controller 148 may be configured to implement virtually any combination of two or more of the controllers 142-146. For example, the combination controller 148 may implement two of the controllers 142-146 to determine the DC change command 130 for each, and may then determine a composite DC change command. In other implementations, the combination controller 148 may implement two or more of the controllers 142-146, and then use a selected one of the resulting DC change commands 130, based on some preference criteria. In still other example implementations, the combination controller may perform some correlation between parameters and/or normalized parameters of the controllers 142-146, and then may decide the DC change command 130 based at least in part on this correlation.

FIG. 12 provides example operations of the last example, in which the combination controller 148 produces the DC change command 130 based on a correlation between the load controller 144 and the RSSI controller 146. Specifically, a correlation may be determined between current load value(s) (e.g., from the ring buffer 138c of FIG. 8) and the percentage of time of high RSSI-over-time value(s) (e.g., from the ring buffer 138d of FIG. 10) (1202). For example, it may be determined that one packet transmitted during the active phase corresponds to "x" percentage of time of high RSSI-over-time.

Then, the combination controller 148 may implement the load controller 144 as a main or primary control loop (1204), according to the description above (e.g., with respect to FIGS. 8 and 9), and including determination of a current load (1206). Meanwhile, the percentage of time with high RSSI-over-time may be determined (1208), e.g., by the RSSI controller 146 as described above with respect to FIGS. 10 and 11, and under the control of the combination controller 148.

If the RSSI-over-time percentage value is not higher than the corresponding current load value (1210), then the load control loop may continue as described herein (1212). If, however, the RSSI-over-time percentage value is higher than the corresponding current load value (1210), then this may indicate a large number of packet collisions, so that the combination controller 148 may increase the active phase (1214) to reduce these packet collisions (e.g., may issue the DC change command accordingly).

Although the example of FIG. 12 is given in terms of the combination of the load controller 144 and the combination controller 148, it may be appreciated that various other combinations are possible. Further, such different combinations may be implemented at different times and in different circumstances, depending, for example, on a priority of the designer (e.g., optimizing energy use of the node 106, as compared to reducing packet collisions on the transmission channel(s)).

Implementations of the various techniques described herein may be implemented in digital electronic circuitry; or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method comprising:

monitoring data packets from a network node at a relay station associated with the network that is configured to forward the data packets to a base station, the network node transmitting the data packets according to a first duty cycle;

determining at least one transmission parameter associated with transmission of the data packets from the network node to the relay station;

relating the at least one transmission parameter to at least one reference value to obtain a normalized transmission parameter;

comparing the normalized transmission parameter to a setpoint value; and generating a duty cycle change command for the network node to forward subsequent data packets according to a second duty cycle, based on the comparing, wherein the at least one transmission parameter and the at least one reference value share a common measurement unit and the normalized transmission parameter is a unitless ratio of the at least one transmission parameter and the at least one reference value.

2. The method of claim 1 wherein the determining at least one transmission parameter comprises:
storing a plurality of values for the at least one transmission parameter in a buffer; and
aggregating the plurality of values into an aggregated value for the at least one transmission parameter.

3. The method of claim 1 wherein the relating the at least one transmission parameter to at least one reference value to obtain a normalized transmission parameter comprises:
relating the at least one transmission parameter to the at least one reference value, the at least one reference value including a secondary transmission parameter.

4. The method of claim 1 wherein the comparing the normalized transmission parameter to an associated set-point value comprises:
storing a plurality of values for the normalized transmission parameter in a buffer;
aggregating the plurality of values into an aggregated value for the normalized transmission parameter; and
comparing the aggregated value for the normalized transmission parameter to the set-point value.

5. The method of claim 1 wherein the generating a duty cycle change command comprises:
synchronizing active transmission phases for the relay station and the network node to match the second duty cycle.

6. The method of claim 1 wherein the determining at least one transmission parameter comprises:
determining a transaction time between a generation of a data packet in response to an event at a sensor of the network node and a reception of the data packet at the relay station.

7. The method of claim 6 wherein the determining the transaction time comprises:
determining a difference between a reception time stamp associated with the data packet upon reception at the relay station with a generation time stamp assigned to the data packet upon generation thereof.

8. The method of claim 1 wherein the determining at least one transmission parameter comprises:
determining a received signal strength indicator (RSSI) of received data.

9. The method of claim 8 wherein the relating the values to at least one reference value to obtain a normalized transmission parameter comprises:
relating the RSSI to a threshold for high RSSI over one or more defined time periods;
determining a value for percentage of time of high RSSI with respect to the defined time periods to obtain the normalized transmission parameter; and
aggregating percentage values of high RSSI-over-time to obtain an aggregated normalized transmission parameter.

10. A method comprising:
monitoring data packets from a network node at a relay station associated with the network that is configured to forward the data packets to a base station, the network node transmitting the data packets according to a first duty cycle;
determining at least one transmission parameter associated with transmission of the data packets from the network node to the relay station;
relating the at least one transmission parameter to at least one reference value to obtain a normalized transmission parameter;
comparing the normalized transmission parameter to a set-point value; and
generating a duty cycle change command for the network node to forward subsequent data packets according to a second duty cycle, based on the comparing,
wherein the determining at least one transmission parameter comprises determining a transaction time between a generation of a data packet in response to an event at a sensor of the network node and a reception of the data packet at the relay station, and
wherein the relating the at least one transmission parameter to at least one reference value to obtain a normalized transmission parameter comprises
determining an average value for a plurality of inter-arrival time values between arrivals of consecutive data packets from the network node, and
relating an average value for a plurality of transaction time values to the average value for the plurality of inter-arrival time values to obtain the normalized transmission parameter as including a relative delay of the data packet.

11. The method of claim 10 wherein the comparing the normalized transmission parameter to an associated set-point value comprises:
comparing the relative delay to a relative delay set-point value.

12. A method comprising:
monitoring data packets from a network node at a relay station associated with the network that is configured to forward the data packets to a base station, the network node transmitting the data packets according to a first duty cycle;
determining at least one transmission parameter associated with transmission of the data packets from the network node to the relay station;
relating the at least one transmission parameter to at least one reference value to obtain a normalized transmission parameter;
comparing the normalized transmission parameter to a set-point value; and
generating a duty cycle change command for the network node to forward subsequent data packets according to a second duty cycle, based on the comparing,
wherein the determining at least one transmission parameter comprises:
determining a packet count of data packets received within a time period, and
wherein the relating the at least one transmission parameter to at least one reference value to obtain a normalized transmission parameter comprises
relating the packet count to a maximum packet count determined from a maximum capacity of at least one associated transmission channel, and
determining a percentage value of a current load relative to the maximum packet count as the normalized transmission parameter.

13. A system in a relay station in communication with both a base station and a network of nodes, the system comprising:
a packet monitor configured to receive data packets from a node of the network of nodes in accordance with a first duty cycle;
a parameter extractor configured to extract at least one transmission parameter, based on the data packets;

at least one buffer configured to store values for the at least one transmission parameter;

normalization logic configured to relate the at least one transmission parameter to a reference value to obtain a normalized transmission parameter; and a controller configured to make a comparison of the normalized transmission parameter and a set-point value and generate a duty cycle change command based on the comparison, wherein the parameter extractor is configured to extract a transaction time between generation of a data packet at the node and reception of the data packet at the relay station, and further configured to extract an inter-arrival time between the data packet and a previous data packet, and wherein the normalization logic is configured to retrieve values for the transaction time from the at least one buffer as the at least one transmission parameter and retrieve values for the inter-arrival time from the at least one buffer as the at least one reference value; and further configured to relate an average transaction time to an average inter-arrival time to obtain the relative delay as the normalized transmission parameter.

14. The system of claim 13 wherein the parameter extractor is configured to determine a received signal strength indicator (RSSI) of the data packets over a time period, and wherein the normalization logic is configured to relate the RSSI to a threshold RSSI value with respect to one or more defined periods of time as the reference value, to obtain a percentage value for RSSI-over-time as the normalized transmission parameter.

15. A system in a relay station in communication with both a base station and a network of nodes, the system comprising:

a packet monitor configured to receive data packets from a node of the network of nodes in accordance with a first duty cycle;

a parameter extractor configured to extract at least one transmission parameter, based on the data packets;

at least one buffer configured to store values for the at least one transmission parameter;

normalization logic configured to relate the at least one transmission parameter to a reference value to obtain a normalized transmission parameter; and a controller configured to make a comparison of the normalized transmission parameter and a set-point value and generate a duty cycle change command based on the comparison, wherein the parameter extractor is configured to determine a packet count of the data packets over a time period, and wherein the normalization logic is configured to relate the packet count to a maximum packet count determined from a maximum capacity of at least one associated transmission channel as the reference value, to obtain a percentage value for the current load relative to the maximum packet count as the normalized transmission parameter.

16. A duty cycle manager comprising:

an evaluation system configured to receive data packets from a node of a network of nodes in accordance with a first duty cycle, extract at least one transmission parameter, and relate the at least one transmission parameter to a reference value to obtain a normalized transmission parameter; and a duty cycle controller configured to make a comparison of the normalized transmission parameter to a set-point value, and to generate a duty cycle change command to change the first duty cycle to a second duty cycle, based on the comparison, wherein the duty cycle controller comprises one or more of:

a relative delay controller configured to generate the duty cycle change command based on a relative delay of the data packets as the normalized transmission parameter;

a load controller configured to generate the duty cycle change command based on a current relative load of one or more transmission channels of the data packets as the normalized transmission parameter;

a relative signal strength indicator (RSSI) controller configured to generate the duty cycle change command based on a percentage value for RSSI-over-time as the normalized transmission parameter; and a combination controller configured to generate the duty cycle change command based on a combination of operations of two or more of the relative delay controller, the load controller, and the RSSI controller.

* * * * *